United States Patent

Wnuk

Patent Number: 4,525,231
Date of Patent: Jun. 25, 1985

[54] METHOD OF MAKING CUSHIONED AUTOMOTIVE STRAP HANDLE

[75] Inventor: Jack G. Wnuk, Lapeer, Mich.

[73] Assignee: Voplex Corporation, Pittsford, N.Y.

[21] Appl. No.: 502,184

[22] Filed: Jun. 8, 1983

[51] Int. Cl.³ .............................................. B31C 5/00
[52] U.S. Cl. .................................... 156/185; 156/187; 156/192; 156/213; 156/245; 264/45.5; 264/46.4; 264/46.7; 264/145; 264/328.1
[58] Field of Search .............. 156/185, 187, 245, 192, 156/213; 24/265 R; 264/46.7, 46.4, 45.5, 145, 157, 167, 328.1; 425/308, 132

[56] References Cited

U.S. PATENT DOCUMENTS

| | | |
|---|---|---|
| 2,206,078 | 7/1940 | Cunnington . |
| 2,213,479 | 9/1940 | Voit et al. ............................ 156/245 |
| 3,952,383 | 4/1976 | Moore et al. . |
| 3,977,054 | 8/1976 | Moore et al. . |
| 4,174,988 | 11/1979 | Moore et al. . |
| 4,299,924 | 11/1981 | Nomura et al. ...................... 521/131 |
| 4,409,163 | 10/1983 | Van Manen ........................ 264/45.5 |
| 4,434,119 | 2/1984 | Teare .................................. 264/145 |

Primary Examiner—Jay H. Woo
Assistant Examiner—Timothy W. Heitbrink
Attorney, Agent, or Firm—Stonebraker, Shepard & Stephens

[57] ABSTRACT

Cushioned automotive strap handles with spring steel base strips, cushions, and wrapped and sealed covers are made by injection molding resin cladding directly onto steel base strips before assembly with the cushion and cover. The base strips 10 are cut to length with formed end regions 11 which are mounted on a mold part 15 so that a midregion of base strip 10 spans an injection mold cavity 18. Pins 21 within mold cavity 18 locate base strip 10 in a plane spaced from the cavity walls so that the cavity surrounds the midregion of the base strip. The injection molded resin cladding 25 also surrounds the midregion of base strip 10 and provides raised resin shoulders 20 extending along longitudinal side edges of the base strip. The surrounding engagement of cladding 25 secures resin shoulders 20 against transverse movement relative to the base strip. Resin clad base strip 10 is then assembled with a cushion 26 and a cover 30 that is wrapped and sealed to a seam region 23 of resin cladding 25 between raised shoulders 20. Alternatively, claddings 25 can be molded at spaced intervals on a continuous length of base strip 10 which is thereafter cut and punched to form discrete lengths of clad base strip for assembly with a cushion and wrapper.

15 Claims, 10 Drawing Figures

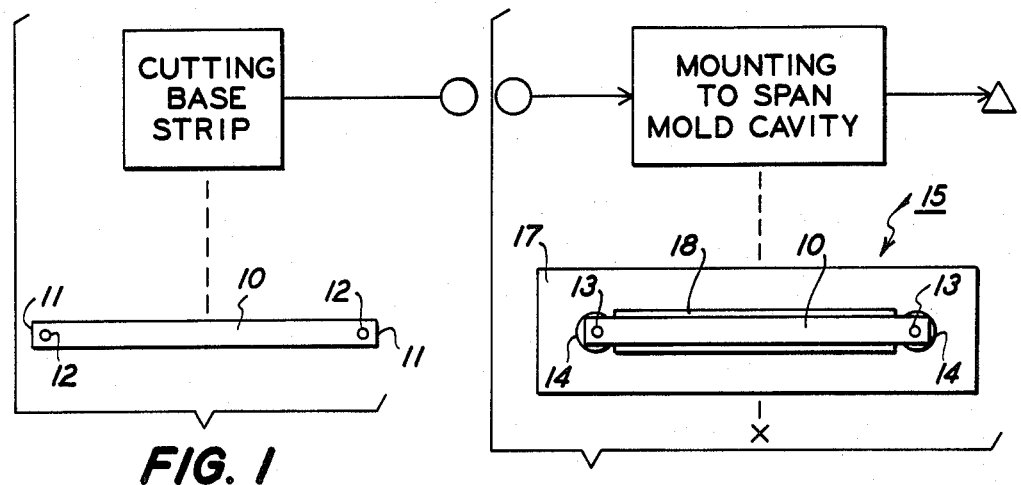
FIG. 1
FIG. 2a
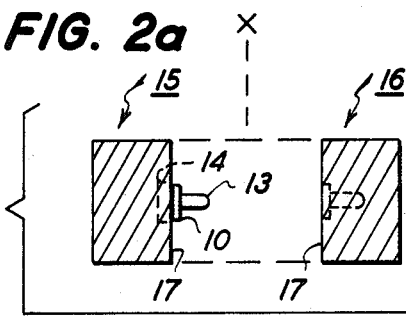
FIG. 2b
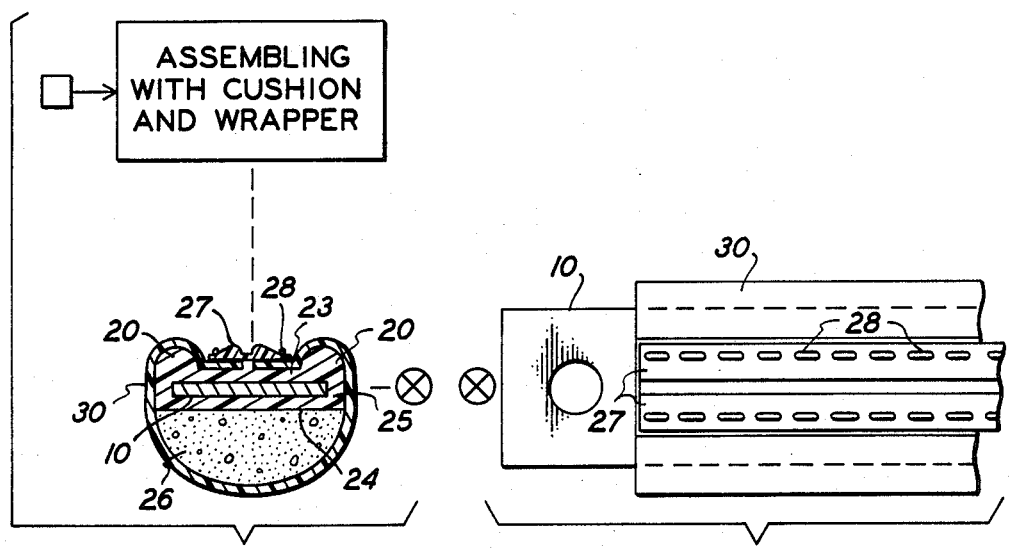
FIG. 5a
FIG. 5b

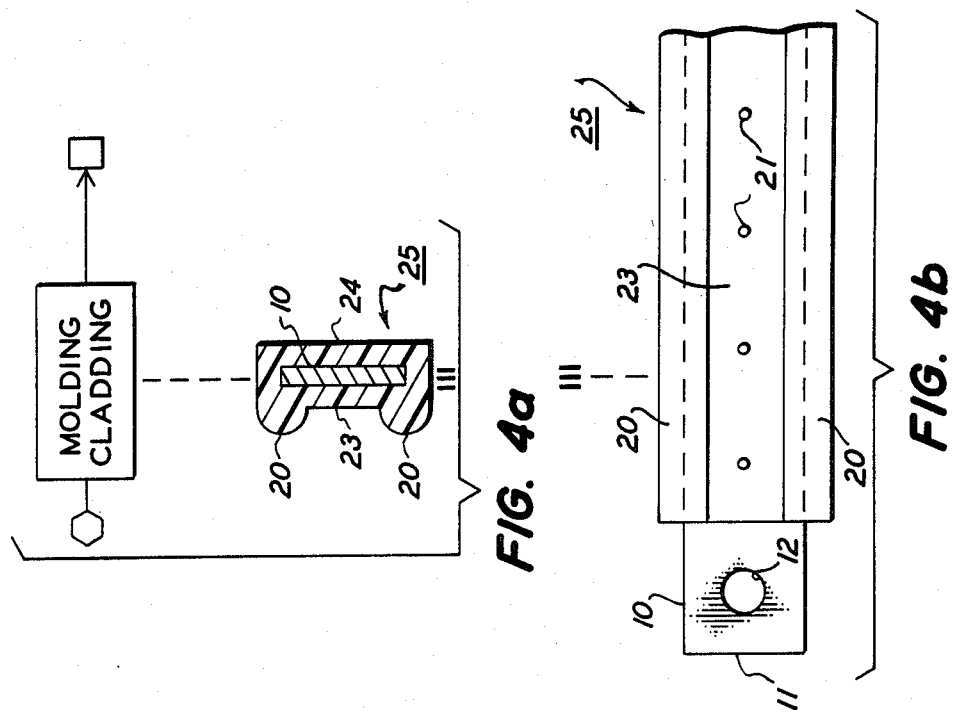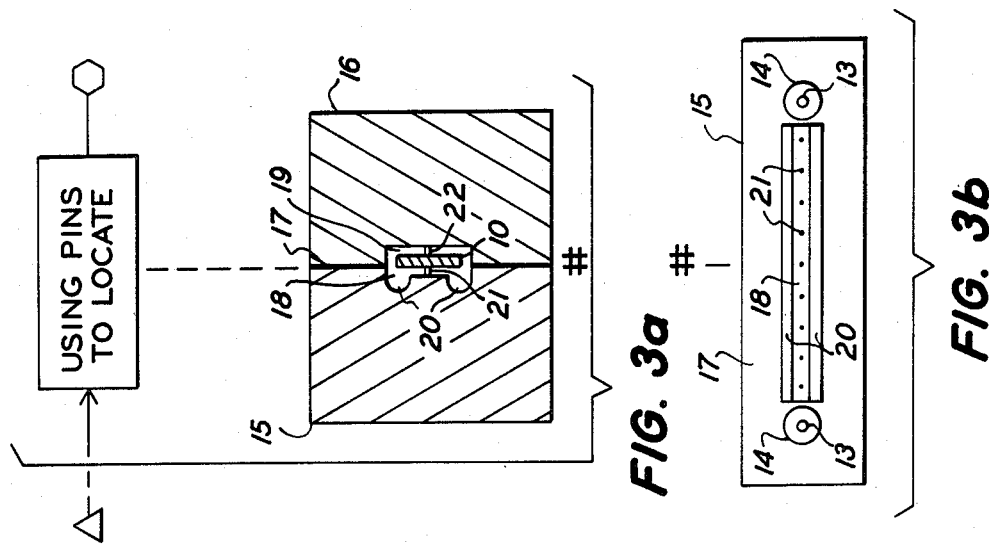

METHOD OF MAKING CUSHIONED AUTOMOTIVE STRAP HANDLE

BACKGROUND

Cushioned automotive strap handles are a well-developed art as best shown in Moore et al. U.S. Pat. Nos. 3,952,383; 3,977,054; and 4,174,988 and Cunnington U.S. Pat. No. 2,206,078. For the last decade or so, such handles have used a spring steel base strip with its ends formed for mounting to give the strap handle flexibility and strength. The steel strip has been assembled with a cushion and a shoulder strip wrapped within a cover that is dielectrically sealed with a seam-concealing trim strip. To help bond the assembled parts together with the dielectric seal, the steel strip has been made with a polyvinyl chloride laminate on the side where the seal is made. The shoulder strip is extruded with a groove for receiving the laminated steel strip, and the shoulder strip is assembled to the steel strip by spreading the shoulders apart to open the groove and snap the shoulder strip over the edges of the steel strip.

Besides expense, which is always an issue in manufacturing automotive components, the prior art process of making cushioned strap handles involves several unsolved problems.

The shoulder strip occasionally falls off the steel strip before assembly and must be reattached to the steel strip before the assembly can be completed. This slows down assembly operations. Also, the shoulders of the shoulder strip sometimes move transversely of the steel strip when the strap handle is subjected to twisting forces. This can displace the shoulder strip and disfigure the appearance of the strap handle.

I have devised a way of molding a shouldered cladding directly onto a steel strip to solve these problems and also reduce the expense of the strap handle. My method produces sturdy strap handles that resist harsh use and yet are less expensive to make than prior art strap handles.

SUMMARY OF THE INVENTION

My method produces cushioned automotive strap handles having a base strip with a cushion on one side and a cover that is wrapped around the cushion and the base strip and sealed in place. I begin by cutting a steel base strip to length with formed end regions for mounting, and I prefer bare steel strips to save the extra cost of steel with a resin laminate on one side. I mount the formed end regions of the base strip so that its midregion spans an injection molding cavity, and I locate the base strip in a plane spaced from the walls of the cavity so that the cavity surrounds the midregion of the base strip. I then injection mold a resin cladding to surround the midregion of the base strip and provide raised resin shoulders extending along longitudinal edges of the base strip. I use the surrounding engagement of the resin cladding with the base strip to secure the resin shoulders against transverse movement relative to the base strip. I then assemble the resin clad base strip with a cushion on the side opposite the shoulders by wrapping a cover around the cushion, over the raised shoulders, and sealing the cover to the resin cladding between the shoulders. Since the resin cladding surrounding the base strip is practically immovable relative to the base strip and since the cover is sealed to the resin cladding, everything, including the raised shoulders, stays in place and resists twisting forces.

By an alternative method, I use an indexing strip feed to advance lengths of a continuous base strip into the injection molding cavity and injection mold a series of spaced claddings on an uncut base strip. Following this I cut discrete base strip lengths apart in the region between molded claddings and form the ends of each strip. I then assemble each resin clad base strip with a cushion and wrapper.

DRAWINGS

FIGS. 1-5 combine a schematic block diagram of a sequence of process steps with associated illustrations of components and mold parts involved with each step.

FIG. 1 is a plan view of a base strip cut with formed end regions;

FIG. 2a shows the base strip mounted on a mold part having a mold cavity, and FIG. 2b schematically shows both parts of the mold holding the base strip;

Figure 6:
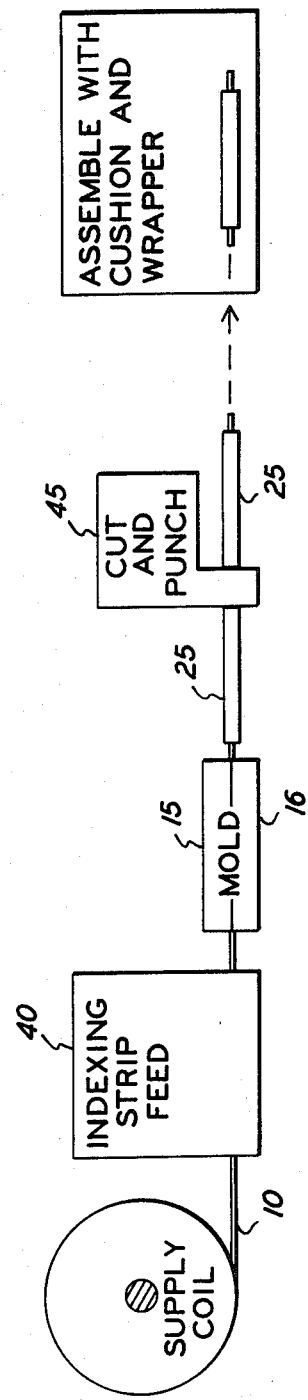

FIG. 3a schematically shows a central cross-sectional region of a closed injection mold using pins to hold the base strip at the mold parting plane and defining a cavity surrounding the base strip, and FIG. 3b shows an elevation of one part of the mold having locating pins;

FIG. 4a is a central transverse cross-sectional view of the base strip surrounded by a molded resin cladding, and FIG. 4b is a plan view of the base strip surrounded by a resin cladding;

FIG. 5a is a transverse cross-sectional view of the finished strap handle with the resin clad base strip and cushion surrounded by a wrapped and sealed cover, and FIG. 5b is a plan view of the completed strap handle; and FIG. 6 is a schematic diagram of an alternative preferred method using an indexing strip feed to intermittently advance a continuous base strip into an injection mold followed by cutting and punching the strip to form discrete lengths of clad base strip for assembly with a cushion and wrapper.

DETAILED DESCRIPTION

One preferred method as shown in FIGS. 1-5 begins with cutting base strip 10 to a suitable length and shape by using generally known cutting equipment. The cutting to length and width also preferably forms end regions 11 of base strip 10 with holes 12 for mounting. Several configurations for end regions 11 are presently required to accommodate different mounting hardware and escutcheons.

Base strip 10 is presently required to be formed of spring steel, although a high tensile strength resin strip is also possible for base strip 10. For steel base strips, my method can use bare steel rather than steel bearing a polyvinyl chloride laminate as has been necessary with prior art strap handle constructions.

I then mount base strip 10 on an injection mold part 15 by placing end holes 12 over pins 13. Magnetic inlays 14 at the base of each pin 13 hold steel base strips 10 flat against the parting plane face 17 of mold part 15. Mold part 16 with a matching parting plane face 17 closes against mold part 15 to complete a cavity around base strip 10 as shown in FIG. 3a.

Mold part 15 has a shoulder forming cavity 18 disposed along one side of the midregion of base strip 10, and mold part 16 has a generally shallow cavity 19 on the opposite side of base strip 10. When the mold is closed, cavities 18 and 19 communicate and surround base strip 10. Cavity 18 is configured to form a pair of raised shoulders 20 extending along longitudinal side edges of base strip 10.

Cavity 18 also has a spaced row of pins 21 that bear against one face side of base strip 10 to locate base strip 10 in the intended plane spaced from the walls of cavities 18 and 19. Cavity 19 can also have locator pins 22 disposed opposite pins 21 for locating both sides of strip 10. It is also possible to use locator pins on only one side of base strip 10, such as pins 21 in cavity 18, and inject resin into cavity 19 so that the resin flowing into the mold presses base strip 10 against locator pins 21 and thereby holds strip 10 in the proper position. Locator pads or edges other than pins are also possible.

After resin is injected into the mold and set, base strip 10 acquires a resin cladding 25 surrounding its midregion. Cladding 25 has raised shoulders 20 extending longitudinally along opposite side edges of base strip 10. The surrounding engagement of resin cladding 25 with both face sides and side edges of base strip 10 anchors shoulders 20 securely against any transverse movement relative to base strip 10. The resin used for cladding 25 is preferably polyvinyl chloride, but other choices are possible, depending on cost and customer criteria.

Cladding 25 is preferably thin except for raised shoulders 20. In seam region 23 between raised shoulders 20, cladding 25 is preferably no more than 0.035 inches thick. On the side of base strip 10 opposite seam region 23 along cushion side 24, cladding 25 is preferably no more than 0.045 inches thick. Such thicknesses are adequate to ensure a secure attachment between cladding 25 and base strip 10 and are adequate to support shoulders 20 against twisting force and yet are thin enough to conserve on material, weight, and expense. Seam region 23 also provides well anchored resin for a dielectric seal holding a wrapped cover 30 in place as shown in FIG. 5a.

Base strip 10 with its resin cladding 25 is then assembled into a complete pull strap as shown in FIGS. 5a and 5b. Cushion 26 of resilient, foamed resin material is placed adjacent cushion side 24 of cladding 25; and cover 30 is wrapped around cushion 26 and base strip 10 with its cladding 25. Cover 30 wraps over shoulders 20 to bring its longitudinal edges adjacent each other in seam region 23 between shoulders 20 as shown in FIG. 5a. Longitudinal edges of cover 30 are preferably covered by a trim strip 27. Then a dielectric seal bonds trim strip 27, the edges of cover 30, and seam region 23 together in a fused resin bond that securely holds everything in place. The dielectric sealing tool can also emboss trim strip 27 with simulated stitching or some other decorative pattern 28 to improve the appearance. The wrapping and sealing of cover 30 and trim strip 27 are generally similar to prior art assembly. Remaining steps to complete a strap handle, such as bending to longitudinal shape, are also well known.

An alternative to the method of FIGS. 1–5 is to mold resin cladding 25 at regular intervals on a continuous base strip 10 and then cut and form the end of discrete lengths of the base strip by severing it in the region between molded claddings 25. This changes the way base strip 10 is fed through an injection mold and reverses the order of the molding and the cutting and forming steps. Otherwise, the final assembly of resin clad lengths of base strip occurs as previously explained relative to FIGS. 5a and 5b. Mold parts 15 and 16 are also similar to those explained above except for lacking pins 13 on which to mount base strips 10 for molding.

By the method of FIG. 6, base strip 10 is wound in a supply coil having an indefinite length, and base strip 10 is advanced by an indexing strip feed 40 that advances a suitable length of base strip 10 while mold parts 15 and 16 are open and stops and holds base strip 10 still while mold parts 15 and 16 are closed for molding. Locating strip 10 in the desired plane within the mold cavity can be the same as described above, and injection molded claddings 25 are formed in the same way as described above except that claddings 25 are spaced along an uncut length of base strip 10.

Following the molding of claddings 25 on base strip 10, a cutting and punching tool 45 cuts base strip 10 in the region between claddings 25, punches holes 12, and accomplishes any other end formation necessary for each discrete length of base strip 10. These then proceed to assembly with a cushion and wrapper as explained above.

The strap handle completed by my method benefits from sturdier and better anchored shoulders 20, reduced assembly costs from molding cladding 25 directly onto strip 10, and reduced materials expense from eliminating any need for resin laminated steel. Reducing cost while improving a product is always a worthwhile advance in the manufacture of automotive components.

I claim:

1. A method of making cushioned automotive strap handles having a base strip, a cushion on a side of said base strip, and a cover that is wrapped around said cushion and said base strip and sealed in place, said method comprising:
   a. cutting said base strip to length with formed end regions;
   b. mounting said formed end regions of said base strip so that a midregion of said base strip spans an injection molding cavity;
   c. locating said base strip in a plane spaced from walls of said cavity so that said cavity surrounds said midregion of said base strip;
   d. injection molding a resin cladding to surround said midregion of said base strip and provide raised resin shoulders extending along longitudinal side edges of said base strip;
   e. using the surrounding engagement of said resin cladding with said base strip to secure said resin shoulders against transverse movement relative to said base strip; and
   f. assembling said resin clad base strip with said cushion by wrapping said cover around said cushion and over said raised shoulders and sealing said cover to a seam region of said resin cladding between said shoulders.

2. The method of claim 1 including using holes in said formed end regions of said base strip for mounting said base strip on pins located on opposite sides of said molding cavity.

3. The method of claim 1 including using locating pins arranged within said mold cavity along said plane of said base strip for said locating of said base strip.

4. The method of claim 1 including forming said resin cladding on a side of said base strip between said resin shoulders to have a thickness of no more than 0.035 inches.

5. The method of claim 4 including forming said resin cladding on a side of said base strip opposite said resin shoulders to have a thickness of no more than 0.045 inches.

6. The method of claim 5 including using holes in said formed end regions of said base strip for mounting said base strip on pins located on opposite sides of said molding cavity.

7. The method of claim 6 including forming said resin cladding on a side of said base strip between said resin shoulders to have a thickness of no more than 0.035 inches.

8. The method of claim 1 including forming said resin cladding on a side of said base strip between said resin shoulders to have a thickness of no more than 0.035 inches and forming said resin cladding on a side of said base strip opposite said resin shoulders to have a thickness of no more than 0.045 inches.

9. The method of claim 1 including using holes in said formed end regions of said base strip for mounting said base strip on pins located on opposite sides of said molding cavity and using pins arranged within said mold cavity for said locating of said base strip.

10. A method of making cushioned automotive strap handles having a base strip, a cushion on a side of said base strip, and a cover that is wrapped around said cushion and said base strip and sealed in place, said method comprising:
   a. index feeding a continuous length of said base strip relative to an injection molding cavity by advancing said base strip when said molding cavity is open and stopping said base strip when said molding cavity is closed so that successive discrete lengths of said base strip span said molding cavity for each injection molding cycle;
   b. locating said base strip in a plane spaced from walls of said cavity so that said cavity surrounds said base strip;
   c. injection molding a resin cladding to surround a midregion of each of said discrete lengths of said base strip and provide raised resin shoulders extending along longitudinal side edges of said base strip;
   d. using the surrounding engagement of said resin cladding with said base strip to secure said resin shoulders against transverse movement relative to said base strip;
   e. cutting in regions between said resin claddings to form said base strip to said discrete lengths with formed end regions; and
   f. assembling each cut and formed discrete length of resin clad base strip with said cushion by wrapping said cover around said cushion and over said raised shoulders and sealing said cover to a seam region of said resin cladding between said shoulders.

11. The method of claim 10 including forming said resin cladding on a side of said base strip between said resin shoulders to have a thickness of no more than 0.035 inches.

12. The method of claim 10 including forming said resin cladding on a side of said base strip opposite said resin shoulders to have a thickness of no more than 0.045 inches.

13. The method of claim 10 including using locating pins arranged within said mold cavity along said plane of said base strip for said locating of said base strip.

14. The method of claim 13 including forming said resin cladding on a side of said base strip between said resin shoulders to have a thickness of no more than 0.035 inches.

15. The method of claim 14 including forming said resin cladding on a side of said base strip opposite said resin shoulders to have a thickness of no more than 0.045 inches.

* * * * *